May 6, 1969  B. H. KRYZER ET AL  3,442,624
WATER CONDITIONING SYSTEM
Filed Dec. 31, 1964  Sheet 2 of 2
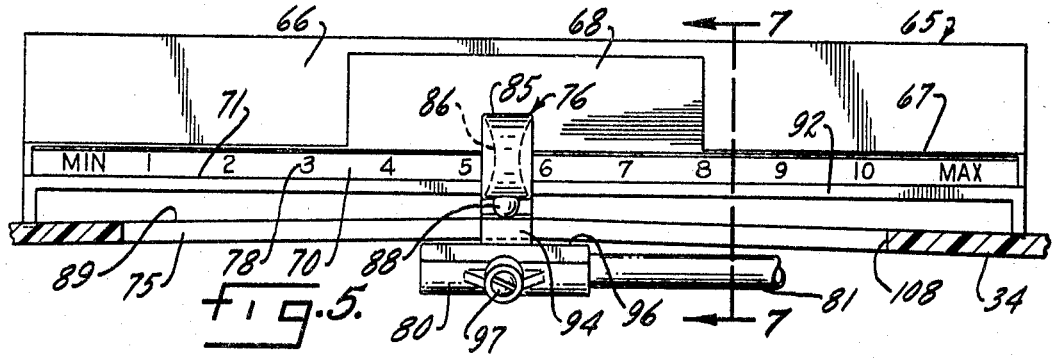
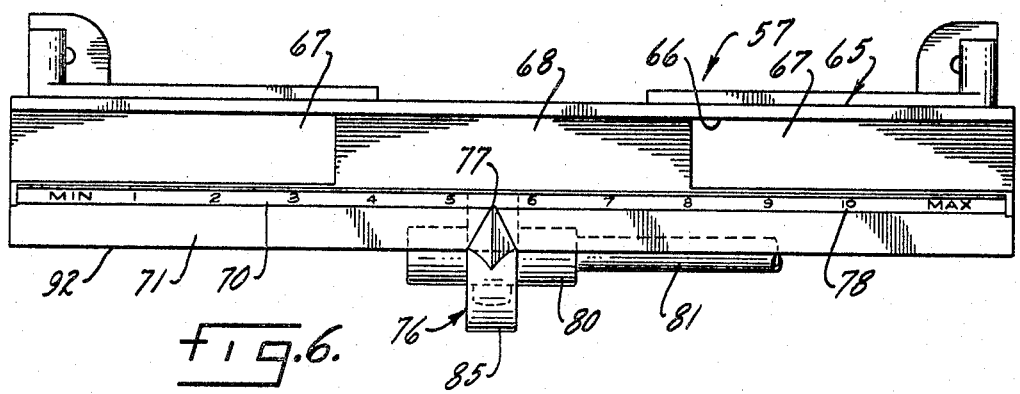
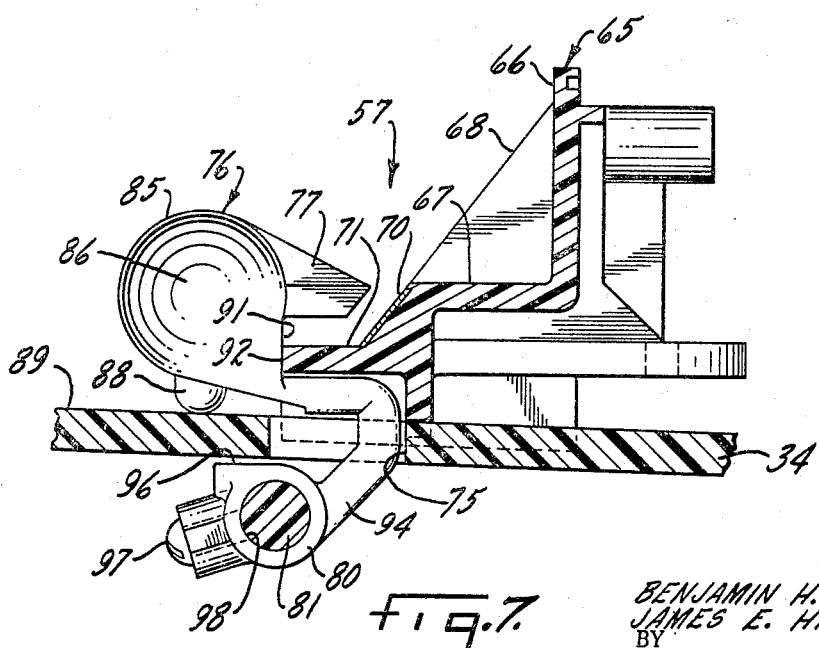
INVENTORS.
BENJAMIN H. KRYZER
JAMES E. HIERS
BY
Hume, Groen, Clement & Hume
Attorneys.

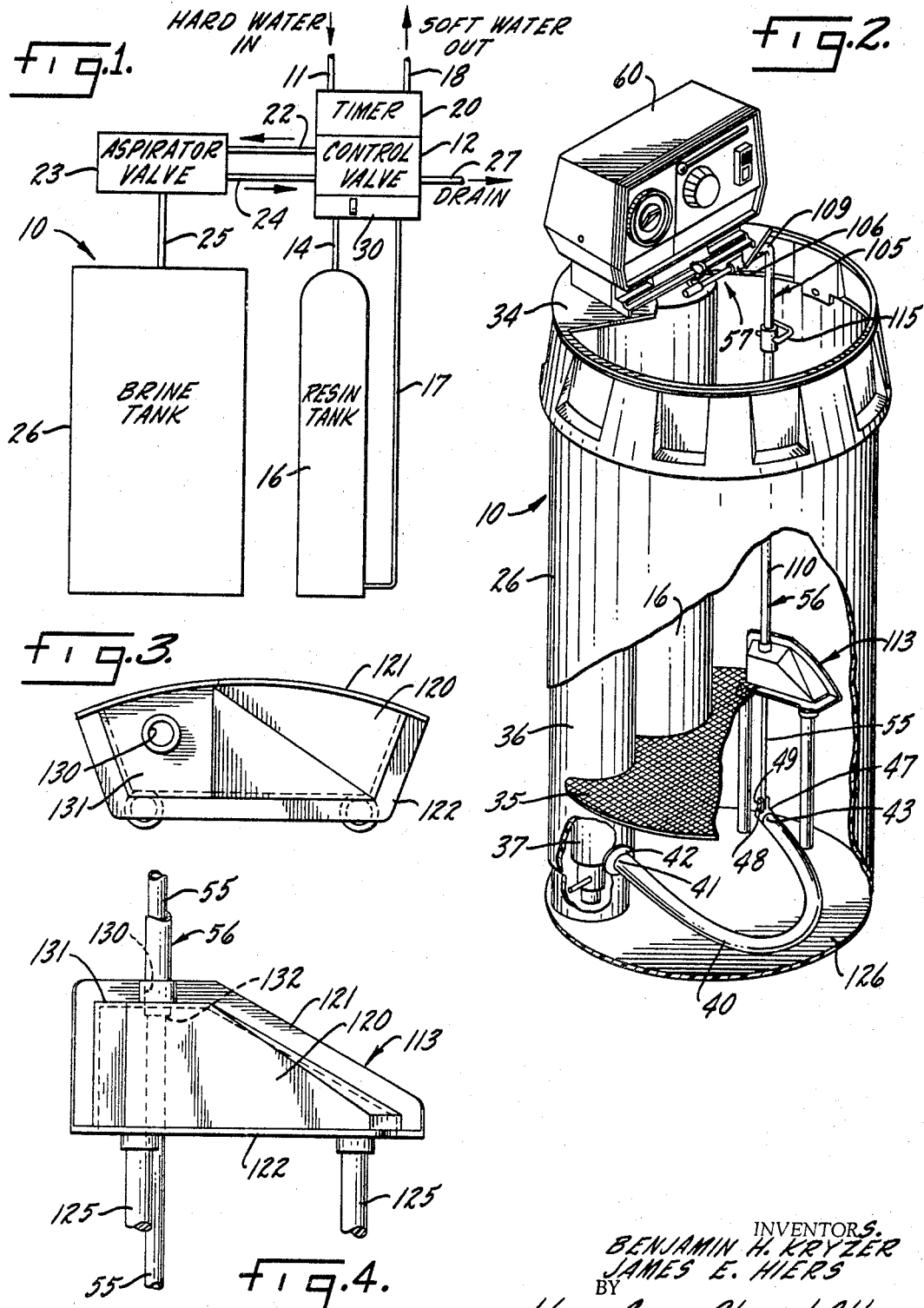

United States Patent Office 3,442,624
Patented May 6, 1969

3,442,624
WATER CONDITIONING SYSTEM
Benjamin H. Kryzer and James E. Hiers, St. Paul, Minn., assignors, by mesne assignments, to Union Tank Car Company, Chicago, Ill., a corporation of Delaware
Filed Dec. 31, 1964, Ser. No. 422,725
Int. Cl. B01d 11/04
U.S. Cl. 23—272                                    5 Claims

ABSTRACT OF THE DISCLOSURE

A tank dissolver provided with a perforate tray to support a solute body with solvent. Solvent underlies the body. A flexible hose below the tray is fixed at one end with a free opposed end. The tray is provided with a recess into which the free end is received so that it can be elevated above the level of the tray.

---

This invention relates in general to a water conditioning system. It deals more particularly with the regeneration of ion exchange material in such a system.

Water softening with ion exchange material such as resin particles or the like is well known in the art. During the softening process, or service cycle, the ion exchange resin particles acquire hardness inducing ions from the water in exchange for "soft ions," or ions which do not induce hardness. After prolonged contact of the resin particles with raw water, their ion exchange capacity is diminished considerably and regeneration of the resin particles must be accomplished, conventionally by contacting the resin particles with a brine solution, i.e. an aqueous solution of sodium chloride or potassium chloride or the like.

The ion exchange process and the regeneration of the ion exchange material are accomplished in a softener or resin tank of well known construction, while a separate brine tank is conventionally employed to manufacture and store brine between regeneration cycles. When regeneration is initiated in the system by a suitable timing means, brine is drawn from the brine tank and passed through the bed of ion exchange material in the softener tank to reverse the exchange of ions and revitalize the bed by removing hardness inducing ions and replacing them with sodium ions, or example, from the brine solution.

The precise amount of brine which will be required to completely regenerate a bed of iron exchange material of predetermined volume, is dependent upon the extent to which the bed is "exhausted" by the softening process, of course. This, in turn, depends upon a number of factors, including (1) the extent of hardness of the water being treated, (2) and the amount of water treated during a service cycle. To enhance the economy of the system, it is desirable to precisely limit the amount of salt utilized in a regeneration cycle to the amount required, and a number of salt control arrangements are presently utilized in the interest of salt economy; evidence U.S. Patent No. 3,058,816, issued Oct. 16, 1962, and entitled "Brine Making and Dispensing Device."

It is an object of the present invention is provide an improved arrangement for conserving salt in a water conditioning system.

It is another object to provide an improved salt conservation arrangement which permits precise control of the amount of salt utilized in a regeneration cycle of a water conditioning system.

It is still another object to provide a salt conservation arrangement of the aforedescribed character which provides finger-tip control of the amount of salt utilized for each regeneration cycle.

It is yet another object to provide a salt conservation arrangement which is simpler and less expensive than broadly similar arrangements presently utilized.

The foregoing and other objects are realized in accord with the present invention by providing a salt conservation arrangement which precisely establishes a predetermined brine draw and, accordingly, a precalculated salt consumption rate for each regeneration cycle, through finger tip control at the console of the central timer and valve complex in the water conditioning system. The salt conservation arrangement permits a wide range of variation of the brine draw with minimal manipulation and effort on the part of the home owner, for example, or service man. Furthermore, the salt conservation arrangement embodying features of the present invention is fabricated simply and inexpensively.

The invention, both as to its organization and method of operation, taken with further objects and advantages thereof, will best be understood by reference to the following description taken in conjunction with the accompanying drawings, in which:

FIGURE 1 is a schematic view of a water conditioning system incorporating a salt conservation arrangement embodying features of the present invention;

FIGURE 2 is a diagrammatic view of the commercial form of the water conditioning system illustrated in FIGURE 1, with parts broken away and the salt conservation arrangement illustrated in greater detail;

FIGURE 3 is an enlarged top plan view of a component housing member for the salt conservation arrangement;

FIGURE 4 is an enlarged front elevational view of the housing member illustrated in FIGURE 3;

FIGURE 5 is a front elevational view of index and control components in the salt conservation arrangement;

FIGURE 6 is a top plan view of the index and control components illustrated in FIGURE 5; and FIGURE 7 is a sectional view taken along line 7—7 of FIGURE 5.

To fully understand the present invention in salt conservation arrangement for a water conditioning system, a brief description of such a system is in order. Accordingly, reference is made to FIGURE 1 where a water conditioning system of broadly conventional construction is illustrated schematically at 10. The system 10 is designed to soften city main water when it is delivered to a residence, for example, during a "service cycle" of the system. Periodically the system 10 is "regenerated" in a broadly conventional manner by the use of a brine solution in a regeneration cycle or cycles. As is already evident, the present invention is primarily concerned with the control of salt use during the regeneration cycle.

During the service cycle, raw or hard water from a suitable source is passed through a feed line 11 to a control valve 12. The control valve 12 directs the raw water through a line 14 to a resin tank 16 which contains a bed of the ion exchange particles. The raw water passes through the bed of particles and is withdrawn from the tank through a line 17. The treated water, which has been softened by contact with the ion exchange resin particles, passes through the line 17 to the control valve 12 once more and is directed by the control valve 12 to a service line 18.

After a predetermined quantity of raw water has passed through the resin tank 16, at a time when the ion exchange particles have begun to lose their capacity to effectively soften the raw water, regeneration is initiated by a timer 20. This regeneration conventionally includes cycles wherein the ion exchange particle bed is "backwashed" and "rinsed." It further includes a cycle wherein the ion exchange particle bed is treated to flow through by a brine solution. The brine cycle is initiated by the timer 20 to actuate the control valve 12 and direct raw water from the service line 11 through a bypass line 22 to an aspirator valve 23. This raw water is returned to the control valve from the aspirator valve 23 through a return line 24 but, in passing through the aspirator valve 23, it establishes a pressure reduction by Venturi effect in a brine line 25 connected to the brine tank 26. A concentrated brine solution is drawn up through the brine line 25 from the brine tank 26 by the partial vacuum and flows with the water through the line 24 and the control valve 12 into the line 14 and the resin tank 16. The brine flowing through the bed of ion exchange resin particles removes the hardness inducing ions therefrom and carries them through the line 17 and the control valve 12 to the drain line 27.

As long as there is brine available to the brine line 25 in the brine tank 26 while a partial vacuum is maintained therein, brine treatment of the ion exchange resin bed in the resin tank 16 continues. It is desirable, of course, to have exactly the amount of brine available which will effectively regenerate a bed of ion exchange resin material which has been "exhausted" to a known extent. More precisely, it is desirable to use precisely the right amount of salt and no excess. According to the present invention, it is the salt conservation arrangement 30 embodying features of the present invention which permits the finger tip adjustment of the precise amount of brine draw sought for a prescribed amount of regeneration and thus controls salt usage.

Turning now to FIGURE 2, the water conditioning system 10 is illustrated in its actual commercial form with the resin tank 16 mounted inside the brine tank 26 and the control valve 12 and timer 20 mounted on top of the resin tank on a cover 34 which overlies the brine tank 26 and the resin tank 16. A salt tray 35 of apertured sheet material construction is suitably mounted within the brine tank 26 in surrounding relationship with the resin tank 16 and also surrounding a brine well 36 containing a brine valve 37 which controls the flow of brine to the aspirator valve 23 hereinbefore referred to and mounted in the upper end of the brine well 36 (not shown in FIGURE 2) in a well known manner. The operation of the brine well 36 and brine valve 37 are, in fact, illustrated and described in detail in the Tischler et al. Patent No. 3,126,907, issued Mar. 31, 1964, and assigned to the same assignee as the present invention.

It is the amount of brine which is made available to the brine valve 37 within the brine well 36 that determines the length of the brine cycle. The amount of brine made available to the brine well 36 is, in turn, controlled by the salt conservation arrangement 30 according to the present invention.

The salt conservation arrangement 30 embodying features of the present invention includes a brine hose 40 having an open end 41 secured at a fitting 42 to the brine well 36 so that brine drawn in the opposite open end 43 of the hose 40 is emptied into the brine well 36. The free end 43 of the brine hose 40 has a ring clamp 47 attached thereto which mounts an upwardly extending pair of ears 48 having a pivot pin 49 extending therebetween. The pin 49 is pivotally connected to a linkage tube 55 formed of hollow flexible plastic which slides up and down in its guide assembly 56 when manually manipulated at the control assembly 57 to raise or lower the open free end 43 of the brine tube 40. It is the depth which the end 43 of the brine tube 40 is positioned below the surface of the brine in the brine tank 26 that determines the volume of brine available to be drawn into the brine well 36, and, accordingly, the amount of brine available to be drawn by the aspirator valve 23 through the resin tank 16 in the brine cycle. The amount of brine which is drawn from the brine tank 26 is, in turn, a precise measurement of the amount of salt utilized in a brine cycle, or more completely, in an entire regeneration.

The level of the brine in the brine tank 26 is determined by the brine valve 37 in the brine valve 36 in a manner described in detail in the aforementioned Tischler et al. patent and not specifically pertinent to the present invention. Accordingly, it is not described in greater detail here. Suffice it to say that with salt on the salt platform 35, during a "rinse" cycle of regeneration after the brine cycle, refill water is directed from the control valve 12 through the line 22, the aspirator valve 23, the brine line 25, the brine well 36, and the brine hose 40 into the brine tank 26. The water rises in the brine tank 26 until it reaches a point approximately one-half inch above the salt platform 35 whereupon the brine valve 37 halts the acceptance of any more refill water by the brine tank 26. During the service cycle of the water conditioning system 10, the salt on the salt platform 35 dissolves in the water in the brine tank 26 until the water is saturated at the operating temperature of the system 10. The system 10 operates in the service cycle until regeneration is once again called for by the timer 20 in a well-known manner.

To set the open end 43 of the brine tube 40 at any desired depth relative to the surface of the brine in the brine tank 26, it is only necessary for the home owner or service man to manipulate the control assembly 57, as has been pointed out. The control assembly 57 is mounted on the casing 60 for the timer 20 and control valve 12, and is illustrated in substantial detail in FIGURES 5–7. The casing 60 seats directly on the cover 34 for the brine tank 26.

The control assembly 57 includes a face panel 65 fabricated of plastic or the like and seated against the cover 34 of the brine tank 26 at the lower front of the casing 60. The panel 65 comprises an upright panel section 66 and an upper shelf 67 extending perpendicular to each other, braced by a wedge-shaped stiffening section 68. Extending downwardly from the shelf 67 is an elongated and inclined index face 70, while a lower shelf 71 extends forwardly from the index face 70.

The face panel 65 is seated on the cover 34 for the brine tank 26 so that the lower shelf 71 overlies an elongated slot 75 in the cover. A control–indicator member 76 extends through the slot 75 so that its pointer 77 points at indicia 78 on the index face 70 while its lower attaching end 80 is secured to the upper free end 81 of the linkage tube 55.

The control-indicator member 76 includes a control disc 85 having opposite depressed sides 86 for finger tip engagement. The pointer 77 extends horizontally from the disc 85 toward the indicia 78 and a bearing projection 88 extends downwardly from the disc 85 to ride in sliding engagement on the upper surface 89 of the cover 34 for the brine tank 36. A vertical planar surface 91 below the indicator pointer 77 rides in sliding engagement against the elongated planar surface 92 on the lower shelf 71 to guide the control-indicator member 76.

A generally U-shaped neck 94 extends from the disc 85 immediately underneath the lower shelf 71 and downwardly through the slot 75 to the attaching end 80. The attaching end 80 is generally cylindrical in nature and is elongated in the direction of travel of the control-indicator 76. A flat upper guide surface 96 formed on the attaching end 80 stabilizes the control-indicator 76 against tilting as it slides in the slot 75 in moving the linkage tube 55 upwardly and downwardly in the guide assembly 56. A locking screw 97 extending into the attachment end 80, as illustrated in FIGURE 7, secures the free end 81 of the linkage tube 55 in a cylindrical passage 98 extending through the guide member 80. The plastic linkage tube 55 is solid at this point.

The flexible plastic linkage tube 55 slides up and down in the guide assembly 56, as has been pointed out. The guide assembly 56 includes an inverted L-shaped sleeve 105 formed of rigid plastic material. The rigid plastic sleeve 105 has a horizontally extending section 106 at its upper end. The section 106 extends generally parallel to and under the panel 65 hereinbefore described to the point 108 where the slot 75 begins. At this point 108, the flexible tube 55 enters the rigid tube 105, extends through its uppermost section 106 to the bend 109, and then downwardly through the vertically extending leg 110 of the tube 105, through a housing 113 mounted on the salt tray 35, to pivotal connection at 49 with the free end 43 of the brine tube 40. The leg 110 of the stiff plastic tube 105 is secured adjacent its upper end to the wall of the brine tank 26 by a suitable bracket 115.

The housing 113 is designed to provide passage for the flexible tube 55 through the salt tray 35 without permitting salt particles to fall through the opening in the tray 35. The housing 113 includes an irregularly shaped hollow body 120 having an arcuate outer face 121 with a radius corresponding to the radius of the wall of the brine tank 26. The face 121 is pressed tightly against the wall of the tank 26. A lower flange 122 extends around the other three faces of the body 120 from the wall hugging arcuate faces 121 and underlies the periphery of a correspondingly formed aperture in the salt tray 35, as best illustrated in FIGURE 2. Vertically disposed plastic dowels 125 extend upwardly from the bottom of the brine tank 126 and support the body 120 in position with the flange 122 tightly up against the salt tray 35.

The vertical leg 110 of the rigid guide tube 105 extends through a suitably formed aperture 130 in the upper face 131 of the housing body 120. The leg 110 terminates at a lower end 132 immediately below the upper face 131. The housing body 120 is hollow and, since there is no bottom face on the body, the free end 43 of the brine tube 40 can be drawn full travel from a position immediately against the bottom of the brine tank 26 to a position up in the hollow body 120 of the housing 113 with the tube end 43 actually above the level of the tray 35; remembering that the brine level is maintained approximately one half inch above the salt tray 35 when the brine tank 26 is full.

When the control—indicator 76 is adjusted so that its pointer 77 is pointed at the numeral 10 of the indicia 78, the free end 43 of the brine tube 40 is at its lowermost depth relative to the brine level in the tank 26. This position might be immediately adjacent the bottom of the tank 26. With the salt conservation arrangement 30 set in this manner, a maximum brine draw is effected and a precalculated ten pounds of salt is used in each brine cycle.

To reduce the amount of brine draw and, accordingly, the amount of salt used in each brine cycle, the control indicator is moved to the left as seen in FIGURES 5 and 6 to a lower numeral setting of the indicia 78. When a minimum brine draw is desirable, the control-indicator 76 might be moved all the way to the lowest numeral 1 of the indicia 78. As such, only one pound of salt would be used in each brine cycle.

It will be recognized that the amount of brine draw and, accordingly, the precise amount of salt utilized can simply and expeditiously be preset. By merely moving the control indicator 76 to a selected point relative to the indicia 78, the free end 43 of the brine tube 40 is adjusted accordingly.

We claim:

1. In a brine draw system including a brine tank having a brine valve for fixing the pre-brine cycle level of brine in a brine chamber, the improvement comprising:
   (a) a horizontal foraminous salt tray separating said tank into an upper brine chamber and a lower brine chamber,
   (b) a brine well in said tank extending through said tray into said lower chamber,
   (c) a flexible brine hose in said lower chamber connected to said brine well for transferring water to said brine chambers and brine to said brine well,
   (d) said hose having an open free end through which the liquid passes and the vertical poseition of which determines the amount of brine drawn in a brine cycle,
   (e) housing means extending through an opening in said tray so as to define a receptacle which extends above said tray into said upper chamber and which opens below said tray into said lower chamber,
   (f) said housing means forming a barrier preventing solid salt from passing through said opening,
   (g) operating means secured to said free end of said hose and extending up through said housing and out of said tank to access by operating personnel,
   (h) manipulation of said operating means being effective to draw said free end of said hose upwardly into said housing and through said tray.

2. The improvement in brine draw system of claim 1 further characterized in that:
   (a) said brine tank is provided with a brine tank cover and a control assembly,
   (b) said operating means including a flexible member secured to said hose free end and extending through said salt tray to said control assembly,
   (c) said control assembly including an elongated index panel seated on the brine tank cover and having a substantially linearly aligned series of salt consumption indicating indicia thereon,
   (d) a control indicator slideable relative to said index indicia and connected to said flexible member,
   (e) manual adjustment of said control indicator causing vertical adjustment of said hose free end.

3. The improvement in brine draw system of claim 2 further characterized by and including:
   (a) an elongated slot formed in said brine tank cover beneath said series of indicia,
   (b) said control indicator including neck means extending through said slot and an attachment lower end for securing said control indicator to said flexible member.

4. The improvement in brine draw system of claim 3 further characterized in that:
   (a) said attachment lower end has a bearing surface formed thereon and elongated in the direction of said slot,
   (b) said bearing surface adapted to engage the brine tank cover and stabilize the control indicator in its travel relative to the cover.

5. The improvement in brine draw system of claim 2 further characterized in that:
   (a) said flexible member comprises a plastic tube secured at its lowermost end to said brine hose free end,
   (b) said flexible plastic tube being slidable in an inverted generally L-shaped guide sleeve which changes travel direction of said flexible tube from vertical up out of the brine tank to horizontal under the cover of the brine tank and longitudinally of said slot.

References Cited

UNITED STATES PATENTS

| | | | |
|---|---|---|---|
| 2,236,347 | 3/1941 | Standcliffe | 137—268 X |
| 2,749,222 | 6/1956 | Munroe | 23—312 X |
| 2,880,872 | 4/1959 | Albertson | 210—191 X |
| 3,058,816 | 10/1962 | Rudelick | 23—272 X |
| 3,089,508 | 5/1963 | Schulze | 210—191 X |
| 3,190,726 | 6/1965 | Rudelick | 23—272 X |

NORMAN YUDKOFF, *Primary Examiner.*

S. J. EMERY, *Assistant Examiner.*

U.S. Cl. X.R.

23—272.6; 137—268, 391